United States Patent
Kawasato et al.

(10) Patent No.: US 8,192,715 B2
(45) Date of Patent: Jun. 5, 2012

(54) LITHIUM-CONTAINING COMPOSITE OXIDE AND ITS PRODUCTION METHOD

(75) Inventors: Takeshi Kawasato, Chigasaki (JP); Kazushige Horichi, Chigasaki (JP); Megumi Uchida, Chigasaki (JP); Takuya Mihara, Chigasaki (JP); Naoshi Saito, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 601 days.

(21) Appl. No.: 12/368,371

(22) Filed: Feb. 10, 2009

(65) Prior Publication Data

US 2009/0148772 A1 Jun. 11, 2009

Related U.S. Application Data

(63) Continuation of application No. PCT/JP2007/074874, filed on Dec. 25, 2007.

(30) Foreign Application Priority Data

Dec. 28, 2006 (JP) ................................. 2006-356107

(51) Int. Cl.
*C01B 9/00* (2006.01)
(52) U.S. Cl. .................. 423/594.4; 423/594.6; 423/599; 423/464; 423/465; 423/179.5; 429/219; 429/220; 252/519.1
(58) Field of Classification Search ................ 423/594.4, 423/594.6, 599, 464, 465, 179.5; 429/219, 429/220; 252/519.1
See application file for complete search history.

(56) References Cited

U.S. PATENT DOCUMENTS

| | | | |
|---|---|---|---|
| 7,306,779 B2 * | 12/2007 | Suhara et al. ............... | 423/594.6 |
| 7,381,498 B2 | 6/2008 | Suhara et al. | |
| 7,429,434 B2 | 9/2008 | Mihara et al. | |
| 7,501,209 B2 | 3/2009 | Suhara et al. | |
| 7,749,482 B2 * | 7/2010 | Horichi et al. ............. | 423/594.4 |
| 7,842,268 B2 * | 11/2010 | Kawasato et al. ............. | 423/277 |
| 2006/0257745 A1 | 11/2006 | Choi et al. | |
| 2006/0263690 A1 | 11/2006 | Suhara et al. | |
| 2007/0122705 A1 | 5/2007 | Paulsen et al. | |
| 2009/0017383 A1 | 1/2009 | Suhara et al. | |

FOREIGN PATENT DOCUMENTS

| | | |
|---|---|---|
| JP | 2000-082466 | 3/2000 |
| JP | 2000-128546 | 5/2000 |
| JP | 2002-093417 | 3/2002 |
| JP | 2002-279984 | 9/2002 |
| JP | 2003-077459 | 3/2003 |
| JP | 2004-119218 | 4/2004 |
| JP | 2004-182564 | 7/2004 |
| JP | 2006-093067 | 4/2006 |
| JP | 2006-228733 | 8/2006 |
| JP | 2006-318926 | 11/2006 |
| JP | 2007-265758 | 10/2007 |
| WO | 2005-064715 | 7/2005 |

OTHER PUBLICATIONS

U.S. Appl. No. 12/486,799, filed Jun. 18, 2009, Kawasato, et al.

* cited by examiner

*Primary Examiner* — Steven Bos
(74) *Attorney, Agent, or Firm* — Oblon, Spivak, McClelland, Maier & Neustadt, L.L.P.

(57) ABSTRACT

The present invention provides a lithium-containing composite oxide for a positive electrode for a lithium secondary battery, which has a large volume capacity density and high safety, and excellent durability for charge and discharge cycles and charge and discharge rate property, and its production method.

The lithium-containing composite oxide is represented by the general formula $Li_pN_xM_yO_zF_a$ (where N is at least one element selected from the group consisting of Co, Mn and Ni, M is at least one element selected from the group consisting of Al, Sn, alkaline earth metal elements and transition metal elements other than Co, Mn and Ni, $0.9 \leq p \leq 1.2$, $0.965 \leq x < 2.00$, $0 < y \leq 0.035$, $1.9 \leq z \leq 4.2$, and $0 \leq a \leq 0.05$), wherein when a powder of the lithium-containing composite oxide is classified into small particles with an average particle size of $2 \mu m \leq Ds_{50} \leq 8 \mu m$ and large particles with an average particle size of $10 \mu m \leq Dl_{50} \leq 25 \mu m$, a content of the small particles is from 15 to 40% by weight and a content of the large particles is from 60 to 85% by weight, and $0.01 \leq ys \leq 0.06$, $0 \leq yl \leq 0.02$ and $0 \leq yl/ys < 1$, where (ys) is a ratio of the M element in the above general formula in the small particles and (yl) is a ratio of the M element in the general formula in the large particles.

16 Claims, No Drawings

LITHIUM-CONTAINING COMPOSITE OXIDE AND ITS PRODUCTION METHOD

TECHNICAL FIELD

The present invention relates to a process for producing a lithium-containing composite oxide for a positive electrode of a lithium secondary battery, which has a large volume capacity density, high safety, an excellent cycle property, and an excellent charge and discharge rate property, a positive electrode for a lithium secondary battery containing the lithium-containing composite oxide produced, and a lithium secondary battery therewith.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal or the like (which may be referred to as a "lithium-containing composite oxide" in the present specification) such as $LiCoO_2$, $LiNi_{1/3}Co_{1/3}Mn_{1/3}O_2$, $LiNiO_2$, $LiNi_{0.8}Co_{0.2}O_2$, $LiMn_2O_4$ or $LiMnO_2$, has been known.

Among others, a lithium secondary battery using $LiCoO_2$ as a cathode active material and using a lithium alloy or carbon such as graphite or carbon fiber as a negative electrode, can obtain a high voltage at a level of 4 V, whereby it has been wisely used as a battery having a high energy density.

However, in the case of the non-aqueous type secondary battery using $LiCoO_2$ as a cathode active material, further improvement has been desired in the capacity density per unit volume of the positive electrode layer (which may be referred to as a "volume capacity density" in the present specification) and in the safety, and it had the following problems: it was insufficient in terms of the cycle property relating to reduction in the discharge capacity caused by repetitive charge and discharge cycles, in terms of a weight capacity density or in terms of the charge and discharge rate property.

In order to solve these problems, various studies have been conducted heretofore as described below.

For example, in order to improve the discharge capacity and cycle property, it is proposed to use lithium-containing composite oxide particles with at least two peaks in a particle size distribution (cf. Patent Document 1 and Patent Document 2).

Furthermore, in order to improve battery characteristics such as the charge and discharge rate property, cycle property, packing property, or safety, it is proposed to use a composite oxide obtained by mixing a small-particle-size lithium cobalt composite oxide with particle sizes of from 1 to 6 μm and a large-particle-size lithium cobalt composite oxide with particle sizes of from 15 to 22 μm, or to use a composite oxide obtained by mixing a lithium-containing composite oxide with an average particle size of from 5 to 30 μm and a lithium-containing composite oxide with an average particle size of from 0.1 to 10 μm (cf. Patent Document 3 and Patent Document 4).

Moreover, in order to improve battery characteristics such as the cycle property, discharge capacity, charge and discharge efficiency, or safety, it is proposed to use a lithium-containing composite oxide which is obtained by using a solution in which elements are uniformly dissolved, by adding oxalic acid, maleic acid, lactic acid, citric acid or the like in a solution in which raw materials such as a lithium source, nickel source, cobalt source and manganese source are dissolved (cf. Patent Document 5 and Patent Document 6).

Patent Document 1: JP-A-2000-82466
Patent Document 2: JP-A-2002-279984
Patent Document 3: JP-A-2002-93417
Patent Document 4: JP-A-2004-182564
Patent Document 5: JP-A-2000-128546
Patent Document 6: JP-A-2006-93067

DISCLOSURE OF THE INVENTION

Object to be Accomplished by the Invention

The lithium cobalt composite oxides described in Patent Document 1 to Patent Document 4, showed improvement in the packing property but had a problem, particularly, of deterioration in the safety because they contained small particles of lithium-containing composite oxide with a large specific surface area. There was another problem of deterioration in the charge and discharge rate property because they contained large particles of lithium-containing composite oxide.

The lithium cobalt composite oxides described in Patent Document 5 and Patent Document 6, showed improvement in the cycle property and safety by addition of the elements, but had a problem of decrease in the discharge capacity along with deterioration in the charge and discharge efficiency, and a problem of deterioration in the packing property.

As described above, the properties of the positive electrode for the lithium secondary battery composed of the lithium-containing composite oxide, are in a trade-off relation, and it was extremely difficult to obtain a lithium cobalt composite oxide with a high discharge capacity, high packing property, high safety and excellent charge and discharge rate property.

Under the circumstances as described above, an object of the present invention is to provide a lithium-containing composite oxide with a large volume capacity density, high safety, excellent cycle property and excellent charge and discharge rate property when used in a positive electrode for a lithium secondary battery, a process for producing the lithium-containing composite oxide at reasonable cost, a positive electrode for a lithium secondary battery containing the produced lithium-containing composite oxide, and a lithium secondary battery therewith.

Means to Accomplish the Object

The inventor of the present invention has intensively and extensively studied and found that the above-mentioned object was well accomplished by the invention with the following aspects.

(1) A lithium-containing composite oxide represented by the general formula $Li_pN_xM_yO_zF_a$ (where N is at least one element selected from the (group consisting of Co, Mn and Ni, M is at least one element selected from the group consisting of Al, Sn, alkaline earth metal elements and transition metal elements other than Co, Mn and Ni, $0.9 \leq p \leq 1.2$, $0.965 \leq x < 2.00$, $0 < y \leq 0.035$, $1.9 \leq z \leq 4.2$, and $0 \leq a \leq 0.05$), wherein when a powder of the lithium-containing composite oxide is classified into small particles with an average particle size $Ds_{50}$ of $2\ \mu m \leq Ds_{50} \leq 8\ \mu m$ and large particles with an average particle size $Dl_{50}$ of $10\ \mu m \leq Dl_{50} \leq 25\ \mu m$, the content of the small particles is from 15 to 40% by weight, and the content of the large particles is from 60 to 85% by weight, and $0.01 \leq ys \leq 0.06$, $0 \leq yl \leq 0.02$ and $0 \leq yl/ys < 1$, where (ys) is a proportion of the M element in the above general formula in the small particles, and (yl) is a proportion of the M element in the general formula in the large particles.

(2) The lithium-containing composite oxide according to the above aspect (1), wherein a specific surface area of the small particles is from 0.5 to 1.5 m²/g, a specific surface area of the large particles is from 0.1 to 0.5 m²/g, and a specific surface area of the entire particles of the small particles and large particle is from 0.2 to 0.5 m²/g.

(3) The lithium-containing composite oxide according to the above aspect (1) or (2) wherein the M element comprises Al and at least one element selected from the group consisting of Mg, Zr, Ti, Hf, Nb, Ta, Sn and Zn.

(4) The lithium-containing composite oxide according to any one of the above aspects (1) to (3), wherein the M element comprises at least Al or Mg, and wherein a total amount of Al and Mg in the small particles is larger than that in the large particles.

(5) The lithium-containing composite oxide according to any one of the above aspects (1) to (4), wherein the M element comprises at least Al and Mg.

(6) The lithium-containing composite oxide according to any one of the above aspects (1) to (5), wherein the M element comprises Al and at least one of Zr and Ti, and an atomic ratio of Al/(total of Zr and Ti) is from 1/20 to 40/1.

(7) The lithium-containing composite oxide according to any one of the above aspects (1) to (6), wherein the proportion of the M element in the small particles (ys) and the proportion of the M element in the large particles (yl) satisfy a relation of $0.01 \leq yl/ys \leq 0.7$.

(8) A process for producing the lithium-containing composite oxide as defined in any one of the above aspects (1) to (7), which comprises mixing a mixture containing from 15 to 40% by weight of a small-particle-size precursor with an average particle size of $2 \mu m \leq D_{50} \leq 8 \mu m$ in which from 1 to 6 atomic % of the M element based on a total of the M and N elements, is supported on an N element source, and from 60 to 85% by weight of a large-particle-size precursor with an average particle size of $10 \mu m \leq D_{50} \leq 25 \mu m$ in which at most 2 atomic % of the M element based on a total of the M and N elements, is supported on the N element source, a lithium source, and, if necessary, a fluorine source; and firing the resultant mixture at a temperature of from 700° C. to 1,100° C. in an oxygen-containing atmosphere.

(9) The production process according to the above aspect (8), wherein the mixture of the small-particle-size precursor and the large-particle-size precursor in which the M element is supported on the N element source, is an N element-M element coprecipitated product.

(10) A process for producing the lithium-containing composite oxide as defined in any one of the above aspects (1) to (7), which comprises mixing a lithium source and, if necessary, a fluorine source in a precursor in which the M element is supported on an N element source, obtained by mixing the N element source containing from 15 to 40% by weight of a small-particle-size N element source with an average particle size of $2 \mu m \leq D_{50} \leq 8 \mu m$ and from 60 to 85% by weight of a large-particle-size N element source with an average particle size of $10 \mu m \leq D_{50} \leq 25 \mu m$ and an M element source comprising an aqueous solution of an M element-containing carboxylate; and firing the resultant mixture at from 700° C. to 1,100° C. in an oxygen-containing atmosphere.

(11) The production process according to the above aspect (10), wherein the M element-containing carboxylate is a salt of at least one acid selected from the group consisting of citric acid, maleic acid, lactic acid and tartaric acid.

(12) The production process according to the above aspect (10) or (11), wherein the aqueous solution of the M element-containing carboxylate has a pH of from 2 to 12.

(13) The production process according to any one of the above aspects (8) to (12), wherein the N element source is at least one member selected from the group consisting of a nickel salt, a cobalt salt, a nickel-cobalt coprecipitated product and a nickel-cobalt-manganese coprecipitated product.

(14) The production process according to any one of the above aspects (8) to (13), wherein the N element source is at least one member selected from the group consisting of cobalt hydroxide, cobalt oxyhydroxide, tricobalt tetroxide and cobalt carbonate.

(15) The lithium-containing composite oxide produced by the process as defined in any one of the above aspects (8) to (14).

(16) A positive electrode for a lithium secondary battery comprising a cathode active material, a binder and an electroconductive material, wherein the cathode active material comprises the lithium-containing composite oxide as defined in any one of the above aspects (1) to (7).

(17) A lithium secondary battery comprising a positive electrode, a negative electrode, a non-aqueous electrolyte and an electrolytic solution, wherein the positive electrode is the one as defined in the above aspect (16).

Effect of the Invention

The present invention provides a lithium-containing composite oxide with a large volume capacity density, high safety, excellent cycle property, and excellent charge and discharge rate property when used in a positive electrode for a lithium secondary battery, a process for producing the lithium-containing composite oxide, a positive electrode for a lithium secondary battery containing the produced lithium-containing composite oxide, and a lithium secondary battery therewith.

The reason why the lithium-containing composite oxide provided by the present invention demonstrates the above-mentioned excellent properties as the positive electrode for the lithium secondary battery, is not necessarily clearly understood, but is virtually considered to be as follows.

In the lithium secondary battery using the positive electrode composed of the lithium-containing composite oxide such as lithium cobalt composite oxide, a part of cobalt in the lithium cobalt composite oxide is replaced by Al or Mg in order to improve the safety against thermorunaway occurring when the battery is heated in a charging condition. In this case, however, the discharge capacity per weight of an active material decreases and the density of powder particles decreases, whereby the volume capacity density becomes smaller. Furthermore, the larger the addition amount, the more the improvement of safety, but decrease in the discharge capacity also becomes larger.

In order to solve the above problem, it is proposed to use a lithium cobalt composite oxide in which small particles are close-packed in the space among large particles by controlling a particle size distribution of the lithium cobalt composite oxide, e.g. as described in Patent Document 1. Heretofore, the large particles and small particles were, however, composed of the lithium cobalt composite oxide of the same composition. In the lithium secondary battery using the positive electrode composed of the lithium cobalt composite oxide, the larger the particle size, the smaller the specific surface area, and the higher the safety. However, the charge and discharge rate property will be deteriorated because of decrease in the specific surface area and diffusion-limited effect of lithium.

On the contrary, as the particle size becomes smaller, the charge and discharge rate property is more improved while the safety is deteriorated. Therefore, the conventional lithium cobalt composite oxide was unsatisfactory in terms of the safety, the charge and discharge rate property, the charge and discharge efficiency in the first charge and discharge (which may be referred to simply as "charge and discharge efficiency" in the present specification) and so on.

In the lithium-containing composite oxide of the present invention, the composition proportions of the added elements in the lithium cobalt composite oxide making up the large particles and the small particles, are different from each other, and at the same time, the substitution rate of the M element for the N element in the lithium cobalt composite oxide making up the large particles, is smaller than the substitution rate of the M element for the N element in the small particles.

As described above, as the amount of elements added in the lithium cobalt composite oxide becomes larger, the safety is more improved, but the charge and discharge efficiency and the charge and the discharge rate property are deteriorated. The low safety of the small particles due to the large specific surface area can be improved by increasing the amount of the elements added to the small particles, and the charge and discharge efficiency and the charge and discharge rate property are relatively high because a diffusion distance of lithium ion is shorter than that in the large particles. Therefore, it is possible to obtain the small particles with the safety, the charge and discharge efficiency and the charge and discharge rate property all being high. On the other hand, the large particles have high safety because of the small specific surface area, but the charge and discharge efficiency and the charge and discharge rate property thereof are relatively low because the diffusion distance of lithium ion is longer than that in the small particles. Since the charge and discharge efficiency and the charge and discharge rate property tend to be deteriorated with increase in the addition amount of elements, the addition amount of elements to the large particles is set smaller so as to obtain the large particles with the safety, the charge and discharge efficiency and the charge and discharge rate property all being high. Use of such particles makes it feasible to provide a cathode active material with the high volume capacity density and high safety and with excellent battery characteristics such as the charge and discharge efficiency and the charge and discharge rate property.

As described above, it is considered that the cathode active material for the lithium secondary battery with the high safety and charge and discharge rate property and with the charge and discharge efficiency kept undiminished, is obtained by controlling the safety by appropriately adjusting the compositions of the large particles and the small particles, the specific surface areas thereof, and the contents of the M element therein, and by controlling the charge and discharge efficiency by the difference in the diffusion time of lithium between the large particles and the small particles.

BEST MODE FOR CARRYING OUT THE INVENTION

The lithium-containing composite oxide according to the present invention is represented by the general formula $Li_pN_xM_yO_zF_a$. In the general formula, p, x, y, z and a are defined as above. Especially, p, x, y, z and a are preferably determined as follows: $0.95 \leq p \leq 1.2$, $0.965 \leq x < 1.00$, $0 < y \leq 0.035$, $1.9 \leq z \leq 2.1$ and $0 \leq a \leq 0.05$. In a case where "a" is larger than 0, the composite oxide becomes one in which some of oxygen atoms are substituted by fluorine atoms, and the safety of the cathode active material thus obtained, is improved in this case. In a case where "a" is 0, the discharge capacity tends to be kept undiminished, which is preferable in some cases. In particular, p, x, y, z and a are preferably determined as follows: $0.97 \leq p \leq 1.03$, $0.97 \leq x \leq 0.9995$, $0.0005 \leq y \leq 0.03$, $1.95 \leq z \leq 2.05$ and $0.001 \leq a \leq 0.01$.

In the above general formula, the N element is at least one member selected from the group consisting of Co, Mn and Ni. Among them, it is preferably Co; Ni; Co and Ni; Mn and Ni; or Co, Ni and Mn, and particularly preferably Co.

In the present invention, the M element comprises at least one element selected from the group consisting of transition metal elements other than Co, Mn and Ni; Al; Sn and alkaline earth metals. The above-mentioned transition metal elements here represent the transition metals of Group 4, 5, 6, 7, 8, 9, 10, 11 or 12 in the Periodic Table. Among them, the M element preferably comprises at least one element selected from the group consisting of Al, Zr, Ti, Hf, Nb, Ta, Mg, Sn and Zn. The M element particularly preferably comprises Al, Ti, Zr, Nb or Mg from the viewpoints of the discharge capacity, the safety, the cycle property, and so on.

When the lithium-containing composite oxide of the present invention is classified into small particles with an average particle size $Ds_{50}$ of $2 \mu m \leq Ds_{50} \leq 8 \mu m$ and large particles with an average particle size $Dl_{50}$ of $10 \mu m \leq Dl_{50} \leq 25 \mu m$, the content of the small particles is from 15 to 40% by weight, and the content of the large particles is from 60 to 85% by weight.

There are no particular restrictions on a method for classifying the lithium-containing composite oxide of the present invention, and various methods are applicable. For example, the classification can be conducted by a method of letting the particles pass through a mesh represented by a sieve or the like. Furthermore, it is also possible to adopt a classification method utilizing difference in mobility by airflow. The classification can be conducted easier and precisely by this airflow classification, and a specific apparatus preferably applicable is an Elbow-Jet classification machine.

In the present invention, $Dl_{50}$ is an average particle size $D_{50}$ of the large particles based on a volume, measured by a laser scattering particle size distribution analyzer. $Ds_{50}$ is an average particle size $D_{50}$ of the small particles based on a volume, measured by a laser scattering particle size distribution analyzer. As the particle size of the small particles becomes large, it will not be possible to achieve the closest packing, thereby resulting in decrease in the density; as the particle size of the large particle becomes small, it will not be possible to achieve the closest packing and, even if the closest packing is achieved, a void becomes larger than that in the case of the larger particle size, which is not preferable. Particularly preferably, the content of the small particles is from 20 to 35% by weight, and the content of the large particles is from 65 to 80% by weight.

In the present invention, the proportion of the M element in the above general formula in the small particles (ys) is larger than the proportion of the M element in the above general formula in the large particles (yl). Namely, the proportions are preferably in the ranges of $0.01 \leq ys \leq 0.06$ and $0 \leq yl \leq 0.02$, more preferably $0.02 \leq ys \leq 0.05$ and $0.0 \leq yl \leq 0.01$. Furthermore, $0 \leq yl/ys < 1$, preferably $0.01 \leq yl/ys \leq 0.7$ and more preferably $0.02 \leq yl/ys < 0.5$. When ys and yl are within the above ranges, the discharge capacity, the cycle property or the charge and discharge rate property tends to be further improved. Furthermore, in mass production of the lithium-containing composite oxide of the present invention, the reproducibility can be further improved and the product tends to be efficiently produced. The addition amount of the element as a total of ys and yl is preferably as large as possible in terms of the safety, but the value of yl/ys is preferably within the above range, particularly, because the safety is more improved and the charge and discharge efficiency and the charge and discharge rate property are also more improved as the ratio of the M element in the small particles (ys) is larger than the ratio of the M element in the large particles (yl), i.e., as the value of yl/ys becomes smaller. It is noted that the amount of the M element in the particles can be analyzed by means of an ICP analysis (high-frequency inductively-coupled plasma emission spectrometry) apparatus or the like.

In the present invention, the M element preferably contains a plurality of elements, and the M element particularly preferably contains Al and Mg; in this case, the atomic ratio of Al and Mg is preferably from 1/3 to 3/1, particularly preferably from 2/3 to 3/2, and y is preferably $0.005 \leq y \leq 0.025$, particularly preferably $0.01 \leq y \leq 0.02$; this is particularly preferable because the battery characteristics, i.e., the weight capacity density, the safety and the cycle property are well balanced.

Furthermore, another particularly preferred example is as follows: the M element consists of Mg and M2 (M2 is at least one element selected from the group consisting of Ti, Zr, Ta and Nb); an atomic ratio of M2 and Mg is preferably from 1/40 to 2/1, particularly preferably from 1/30 to 1/5; and y is preferably $0.005 \leq y \leq 0.025$, particularly preferably $0.01 \leq y \leq 0.02$. This example is particularly preferable because the battery characteristics, i.e., the weight capacity density, the volume capacity density, the safety and the cycle property are well balanced.

Moreover, in the present invention, further particularly preferred example is as follows: the M element consists of Zr and Mg; an atomic ratio of Zr and Mg is preferably from 1/40 to 2/1, particularly preferably from 1/30 to 1/5; and y is preferably $0.005 \leq y \leq 0.025$, particularly preferably $0.01 \leq y \leq 0.02$. This example is particularly preferable because the battery characteristics, i.e., the weight capacity density, the volume capacity density, the safety and the cycle property are well balanced.

In the present invention, another particularly preferred example is a case where the M element contains Mg and Al, and further contains Zr and/or Ti because the battery characteristics, i.e., the weight capacity density, the volume capacity density, the safety and the cycle property are well balanced. In this case, Zr and/or Ti preferably co-exists in an amount of from 1/2 to 1/20 of the total mole of Mg and Al.

The lithium-containing composite oxide of the present invention can be produced by various methods. For example, the methods include the following processes (a) and (b).

The process (a): mixing a lithium source, and, if necessary, a fluorine source with a mixture of from 15 to 40% by weight, preferably from 20 to 35% by weight, of a small-particle-size precursor with an average particle size of $2 \, \mu m \leq D_{50} \leq 8 \, \mu m$ in which from 1 to 6 atomic %, preferably from 2 to 5 atomic %, of the M element based on the total of the M and N elements, is supported on an N element source, and from 60 to 85% by weight, preferably from 65 to 80% by weight, of a large-particle-size precursor with an average particle size of 10 $\mu m \leq D_{50} \leq 25 \, \mu m$ in which at most 2 atomic %, preferably at most 1.5 atomic %, of the M element based on the total of the M and N elements, is supported on the N element source; and firing the resultant mixture at a temperature of from 700° C. to 1,100° C. in an oxygen-containing atmosphere.

The process (b): mixing the lithium source and, if necessary, the fluorine source in a precursor in which the M element is supported on an N element source, obtained by mixing the N element source, containing from 15 to 40% by weight, preferably from 20 to 35% by weight of a small-particle-size N element source with an average particle size of $2 \, \mu m \leq D_{50} \leq 8 \, \mu l$ and from 60 to 85% by weight, preferably from 65 to 30% by weight, of a large-particle-size N element source with an average particle size of 10 $\mu m \leq D_{50} \leq 25 \, \mu m$, and an M element source comprising an aqueous solution of M element-containing carboxylate; and firing the resultant mixture at from 700° C. to 1,100° C. in an oxygen-containing atmosphere.

In the above process (a), the small-particle-size and large-particle-size precursors in which the M element is supported on the N element source are preferably an N element-M element coprecipitated product because the M element is allowed to uniformly exist inside the precursor particles. In this case, the content of the M element in the small-particle-size precursor needs to be different from that in the large-particle-size precursor.

The N element-M element coprecipitated product may be a sulfate, a hydrochloride, a nitrate, or the like which contains the N and M elements precipitated by adding a pH adjuster and an alkali in an aqueous solution in which the M element salt and N element salt are dissolved. The pH adjuster to be used may be ammonia, ammonium bicarbonate, or the like. The alkali to be used may be one of hydroxides such as sodium hydroxide, potassium hydroxide and lithium hydroxide.

In the above process (b), the precursor is preferably obtained by mixing the small-particle-size N element source and the large-particle-size N element source in an aqueous solution of an M element-containing carboxylate and evaporating a solvent. Namely, it is preferable to mix the N element source containing from 15 to 40% by weight, preferably from 20 to 35% by weight, of the small-particle-size N element source with the average particle size of $2 \, \mu m \leq D_{50} \leq 8 \, \mu m$ and from 60 to 85% by weight, preferably from 65 to 80% weight, of the large-particle-size N element source with the average particle size of $10 \, \mu m \leq D_{50} \leq 25 \, \mu m$ and the M element source consisting of an aqueous solution of the M element-containing carboxylate, and then evaporate the solvent. By employing this process, the particles of the small-particle-size N element source absorb a larger amount of the solution than the particles of the large-particle-size N element source because of the larger specific surface area and larger pore volume, and as a result, the M element content becomes larger in the small particles than in the large particles. Therefore, we can obtain the precursor particles in which the M element content in the small-particle-size N element source particles is larger and the M element content in the large-particle-size N element source particles is smaller, without a need for separately producing two types of precursor particles. Particularly, a histogram of particle size distribution of the precursor is preferably not a normal distribution generally observed but a bimodal shape with a peak on the large particle side and a peak on the small particle side, or a shape with a tail spread on the small particle side because the difference becomes large between the absorption amount of the solution of the large-particle-size N element source and the small-particle-size N element source and the difference between yl and ys also becomes large. In order to remove an aqueous medium from the mixture of the M element salt aqueous solution and the powders of the respective N element sources, the mixture is dried preferably at from 50 to 200° C., particularly preferably from 80 to 120° C., usually, for from 0.1 to 10 hours. It is preferable to use an aqueous solution of the M element-containing carboxylate as the M element source because the solution can be uniformly mixed with the N element source and others. In this case, we can obtain a cathode active material in which the density of the lithium-containing composite oxide is much higher, and in which a part of the N element is further uniformly substituted by the M element.

In the present invention, the M element-containing carboxylate aqueous solution used as the M element source includes not only a carboxylic acid containing the M element in its molecule (e.g. an M element salt of a carboxylic acid, an M element-containing complex, and so on) but also a mixture of a carboxylic acid and a carboxylic acid containing the M element in a compound. In the present invention, the M element-containing carboxylate preferably used is a carboxylate having at least two carboxyl groups or at least two groups in total, of a carboxyl group and a hydroxyl group or a carbonyl group because it has high solubility, and a concentration of the M element in the aqueous solution can be made high. Particularly, the M element-containing carboxylate is preferably one having a molecular structure wherein from 2 to 4 carboxyl groups exist and wherein from 1 to 4 hydroxyl groups coexist, because the solubility becomes higher. Among them, the M element-containing carboxylic acid is preferably an aliphatic carboxylic acid having a carbon number of from 2 to 8. If the carbon number is at least 9, the solubility of the compound containing the carboxylic acid and M element decreases in the aqueous solution, which is not preferable. The carboxylic acid particularly preferably has a carbon number of from 2 to 6.

Preferable examples of the aliphatic carboxylic acid having a carbon number of from 2 to 8 include citric acid, tartaric acid, oxalic acid, malonic acid, maleic acid, malic acid, racemic acid, lactic acid, glyoxylic acid and so on, and particularly preferable examples thereof include citric acid, maleic acid, lactic acid and tartaric acid because of high solubility and relatively low cost. If a carboxylic acid with a high acidity is used and if the pH of an aqueous solution of a compound containing the carboxylic acid and M element is less than 2, a certain element of the N element source can become easier to dissolve, and it is preferable to adjust the pH in a range of from 2 to 12 by addition of a base such as ammonia. If the pH exceeds 12, a certain element of the N element source can become easier to dissolve, which is not preferable.

The M element-containing carboxylate aqueous solution used in the present invention needs to be substantially an aqueous solution, and an aqueous solution in the form of a suspended aqueous solution or a colloidal aqueous solution is not included in the present invention. It is because the effect of the present invention cannot be sufficiently achieved with the use of the suspended aqueous solution or colloidal aqueous solution. Furthermore, "to be substantially an aqueous solution" means that the aqueous solution may partly contain the colloidal or suspended form as long as the effect of the present invention is achieved.

The M element source used for the preparation of the aqueous solution of the compound containing the above carboxylic acid and M element is more preferably one capable of being uniformly dissolved or dispersed in the aqueous solution of the carboxylic acid used. Examples of the M element source include an inorganic salt such as an oxide, a hydroxide, a carbonate and a nitrate, an organic salt such as an acetate, an oxalate and a citrate, an organic metal chelate complex and a compound stabilizing a metal alkoxide with a chelate or the like. Among others, an oxide, a hydroxide, an oxyhydroxide, a water-soluble carbonate, a nitrate, an acetate, an oxalate or a citrate is more preferable. A citrate is particularly preferable because of large solubility. Furthermore, since the oxalate or citrate aqueous solution has a low pH, the N element might be dissolved from the N element source powder in a process of impregnating the acid into the N element source powder, and in that case, it is preferable to add ammonia to the carboxylic acid so as to adjust the pH preferably in a range of from 2 to 12.

Examples of the M element source, e.g., where M is Al, include aluminum oxide, aluminum hydroxide, aluminum nitrate, aluminum acetate, aluminum oxalate, aluminum citrate, aluminum lactate, basic aluminum lactate and aluminum maleate. Among them, a carboxylate aqueous solution obtained by using aluminum lactate and/or aluminum maleate is preferable because the Al concentration in the aqueous solution can be made high. For example, when M is Zr, examples of the M element source include zirconium ammonium carbonate and zirconium ammonium halide. When M is Ti, an aqueous solution of titanium lactate is preferably used.

The aqueous solution of the carboxylic acid and the compound containing the M element, used in the present invention, is preferably prepared while being heated if necessary. It is preferably heated at from 40° C. to 80° C. and particularly preferably at from 50° C. to 70° C. When heated, the M element source becomes easier to dissolve and the M element source can be dissolved stably in a short period of time.

A concentration of the M element-containing carboxylate aqueous solution used in the present invention is preferably as high as possible because an aqueous medium needs to be removed by drying in a subsequent step. However, if the concentration is too high, the viscosity will become higher to degrade a uniform mixing property with other element source powders making up a cathode active material and make the solution harder to penetrate into the N element source powder. Therefore, the concentration is preferably from 1 to 30% by weight and particularly preferably from 4 to 20% by weight.

The above M element-containing carboxylate aqueous solution may contain an alcohol such as methanol or ethanol, or a polyol having an effect of forming a complex. Examples of the polyol include ethylene glycol, propylene glycol, diethylene glycol, dipropylene glycol, polyethylene glycol, butane diol, glycerin, and so on. A content in that case is preferably from 1 to 20% by weight.

One of the features of the present invention is to use the above M element-containing carboxylate aqueous solution as the M element source, and the lithium source, which is another component contained in the lithium composite oxide, is preferably lithium carbonate or lithium hydroxide. Lithium carbonate is particularly preferable because it is available at reasonable cost. The lithium source is preferably in the form of a powder with an average particle size $D_{50}$ of from 2 to 25 μm. A metal fluoride such as LiF or $MgF_2$ is selected as the fluorine source.

The N element source to be used in the present invention is at least one member selected from the group consisting of a cobalt salt, a nickel salt, a manganese salt, a nickel-cobalt coprecipitated product, a nickel-manganese coprecipitated product, a cobalt-manganese coprecipitated product and a nickel-cobalt-manganese coprecipitated product. Examples of the cobalt salt and nickel salt include salts substantially insoluble in water, e.g. hydroxides, oxyhydroxides, oxides and carbonates. Specifically, when the N element is cobalt, cobalt carbonate, cobalt hydroxide, cobalt oxyhydroxide or cobalt oxide is preferably used. Cobalt hydroxide or cobalt oxyhydroxide is particularly preferably used because the performance can easily be achieved. Furthermore, when the N element is nickel, nickel hydroxide, nickel oxyhydroxide, nickel oxide or nickel carbonate is preferably used. Moreover, when the N element is manganese, manganese hydroxide, manganese carbonate, manganese oxyhydroxide or manganese oxide is preferably used.

Furthermore, preferable examples of the above nickel-cobalt coprecipitated product include nickel-cobalt coprecipitated hydroxide, nickel-cobalt coprecipitated oxyhydroxide, nickel-cobalt coprecipitated oxide and nickel-cobalt coprecipitated carbonate. More specifically, $Ni_{0.8}Co_{0.2}OOH$, $Ni_{0.8}Co_{0.2}(OH)_2$, or the like is preferably used as the N element source containing nickel and cobalt.

When the N element is Co in the present invention, a molar ratio of Li to the total of the N element and M element in the lithium composite oxide, Li/(N+M), is particularly preferably from 0.97 to 1.03. In this case, grain growth of the lithium composite oxide is enhanced and particles with a higher packing property can be obtained.

When the F element is contained in the lithium composite oxide in the present invention, the F element preferably exists on a surface of each lithium-containing composite oxide particle. The existence of the element on the surface can improve the important battery characteristics such as the safety and the charge and discharge cycle property, without degradation of the battery performance, even if it is added in a small amount. The existence of the element on the surface can be determined by spectrometric analysis of particles of the positive electrode, e.g. XPS analysis (X-ray photoelectron spectroscopy analysis).

In the present invention, the M element-containing carboxylate aqueous solution is used as the M element source; the M element-containing carboxylate is one having at least two carboxyl groups or one having at least two groups in total, of Et carboxyl group and a hydroxyl group or a carbonyl group; the lithium composite oxide powder containing the N element source, the M element source and, if necessary, the fluorine source is fired at from 700° C. to 1,100° C. in an oxygen-containing atmosphere to obtain the aimed product.

In the present invention, a method of mixing the M element salt aqueous solution with the N element source powder, the lithium source powder, the fluorine source and others may be a means for spraying the M element salt aqueous solution to the powders of the respective components so as to impregnate the solution into the powders or a means for putting the powders of the respective components into the M element salt aqueous solution stored in a container, and agitating them so as to impregnate the powders with the solution. Furthermore, it is also possible to use a means for mixing the M element salt aqueous solution with the powders of the respective components to form a slurry by a twin screw kneader, an axial mixer, a paddle mixer, a turbulizer, or the like. In this case, a solid content in the slurry is preferably as high as possible as long as the mixture is uniformly mixed, and, normally, a solid/liquid ratio (based on weight) is preferably from 30/70 to 90/10, particularly preferably from 50/50 to 80/20. In addition, it is preferable to perform a decompression treatment in the slurry state because the solution penetrates more into the powders of the respective components.

For removing the aqueous medium from the mixture of the M element salt aqueous solution and the powders of the respective components, the mixture is dried preferably at from 50 to 200° C., particularly preferably at from 80 to 120° C., and usually for from 0.1 to 10 hours. The aqueous medium in the mixture does not necessarily have to be completely removed in this stage because it will be removed in the subsequent firing step. However, it is preferably removed as much as possible in this stage because a large quantity of energy will be required to evaporate the water content in the firing step.

In the present invention, it is preferable to conduct the drying of the above-mentioned mixture and, if necessary, granulation of the mixture at the same time, and examples of methods for conducting these operations include spray dry, flash dry, a belt drier, a Redige mixer, a thermoprocessor as a twin screw drier, a paddle drier, and so on. Among them, use of the spray dry is particularly preferable because of high productivity. When the spray dry is used as the drying and granulating method, particle sizes of granulated particles composed of secondary particles after granulating can be controlled by selecting a spraying method, a supply rate of pressurized gas, a slurry supply rate, a drying temperature, and so on.

In the present invention, particle sizes of the lithium composite oxide precursor before the firing composed of the secondary particles after the drying and granulation, are substantially reflected in particle sizes of the lithium-containing composite oxide finally obtained in the present invention. An average particle size $D_{50}$ of the precursor composed of an aggregate of secondary particles after the drying is preferably from 2 to 8 μm on the small particle side and from 10 to 25 μm on the large particle side in the present invention.

The average particle size $D_{50}$ in the present invention means a volume-based accumulative 50% size ($D_{50}$) which is a particle size at a point of 50% on an accumulative curve when the accumulative curve is drawn so that a particle size distribution is obtained on the volume basis and the whole volume is 100%. It may be referred to simply as "$D_{50}$" in the present invention. Furthermore, "$D_{10}$" means a volume-based accumulative 10% size, and "$D_{90}$" means a volume-based accumulative 90% size. The particle size distribution is obtained from a frequency distribution and accumulative volume distribution curve measured by means of a laser scattering particle size distribution measuring apparatus. The measurement of particle sizes is conducted by measuring the particle size distribution while the powder is sufficiently dispersed in an aqueous medium by an ultrasonic treatment or the like (for example, using Microtrack HRA (X-100) manufactured by NIKKISO CO., LTD.).

The firing is carried out preferably at a temperature of from 700 to 1,100° C. in an oxygen-containing atmosphere in the production of the lithium composite oxide of the present invention. If the firing temperature is lower than 700° C., formation of the lithium composite oxide tends to be incomplete. On the other hand, if it exceeds 1,100° C., the cycle property and the discharge capacity tends to become lowered. The firing temperature is particularly preferably from 850 to 1,050° C.

With respect to the lithium-containing composite oxide thus produced, the average particle size $D_{50}$ is preferably from 2 to 25 μm, particularly preferably from 8 to 20 μm; the specific surface area is preferably from 0.1 to 0.7 m$^2$/g, particularly preferably from 0.15 to 0.5 m$^2$/g; the half value width of the diffraction peak of (110) plane at $2\theta=66.5\pm1°$ as measured by means of an X-ray diffraction analysis in which CuKα rays is used as a radiation source, is preferably from 0.08 to 0.14°, particularly preferably from 0.08 to 0.12°; when the N element is cobalt, the press density is preferably from 3.00 to 3.50 g/cm$^3$, particularly preferably from 3.20 to 3.30 g/cm$^3$. In the present invention, the press density means an apparent density of a lithium composite oxide powder when the powder is pressed under a pressure of 0.33 ton/cm$^2$.

It is noted that the histogram of the particle size distribution of the lithium-containing composite oxide according to the present invention preferably has a bimodal shape with a peak on the large particle side and a peak on the small particle side or a shape with a tail spread on the small particle side, rather than the normal distribution usually observed.

With respect to the lithium-containing composite oxide particles, the average particle size $D_{50}$ is a volume-averaged particle size of secondary particles which are formed by mutual agglomeration and sintering of primary particles, and, in a case where the particles are composed of the primary particles only, the average particle size $D_{50}$ means a volume-averaged particle size of the primary particles.

In a case where a positive electrode for a lithium secondary battery of the present invention is to be produced from such a lithium-containing composite oxide, the powder of the lithium-containing composite oxide is mixed with a carbon type electroconductive material such as acetylene black, graphite or Ketjenblack and a binder material. As the above binder material, polyvinylidene fluoride, polytetrafluoroethylene, polyamide, carboxymethyl cellulose or an acrylic resin may, for example, be preferably employed. The powder of the lithium-containing composite oxide of the present invention, the electroconductive material and the binder material will be formed into a slurry or a kneaded product by using a solvent or a dispersion medium. The resultant is supported on a positive electrode current collector such as an aluminum foil or a stainless steel foil by e.g. coating to form a positive electrode for a lithium secondary battery of the present invention.

In a lithium secondary battery using as the cathode active material a lithium-containing composite oxide of the present invention, a film of a porous polyethylene or a porous polypropylene may, for example, be used as a separator. Furthermore, as the solvent for the electrolytic solution of a battery, various solvents may be used. Among others, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the above lithium secondary battery of the present invention, the above carbonate ester may be used alone or two or more of them may be used as mixed. Moreover, it may be used as mixed with another solvent. Furthermore, depending upon the material of the anode active material, there may be a case where the discharge capacity, the cyclic property or the charge and discharge efficiency can be improved by Et combined use of a chain carbonate ester and a cyclic carbonate ester.

In the lithium secondary battery using as the cathode active material a lithium-containing composite oxide of the present invention, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3Co_2^-$ or $(CF_3SO_2)_2N^-$ is anion. The lithium salt is preferably added in a concentration of from 0.2 to 2.0 mol/l (liter) to the electrolytic solvent or the polymer electrolyte. If the concentration departs from this range, ionic conductivity will decrease, and the electrical conductivity of the electrolyte will decrease. Among others, it is more preferably from 0.5 to 1.5 mol/l.

In the lithium battery using the lithium-containing composite oxide of the present invention as the cathode active material, as the anode active material, a material which can occlude and discharge lithium ions may be used. The material forming the anode active material is not particularly limited, however, lithium metal, a lithium alloy, a carbon material, an oxide comprising, as a main component, a metal of Group 14 or Group 15 in the Periodic Table, a carbon compound, a silicon carbide compound, a silicon oxide compound, titanium sulfide or a boron carbide compound may, for example, be mentioned. As the carbon material, one having an organic material thermally decomposed under various thermal decomposition conditions, artificial graphite, natural graphite, soil graphite, exfoliated graphite or flake graphite may, for example, be used. Further, as the oxide, a compound comprising tin oxide as a main component can be used. As the anode current collector, a copper foil or a nickel foil may, for example, be used. The negative electrode is produced preferably by kneading the anode active material with an organic solvent to form a slurry, which is coated on the metal foil current collector, dried and pressed.

There are no particular restrictions on the shape of the lithium secondary battery using the cathode active material of the present invention. The shape is selected from a sheet shape, a film shape, a folded shape, a wound cylinder with bottom, a button shape and so on, depending upon the intended purpose.

EXAMPLES

Now, the present invention will be described in further detail with reference to Examples. However, the present invention is by no means restricted to such specific Examples.

Example 1

582.58 g of cobalt sulfate heptahydrate, 1.55 g of magnesium sulfate heptahydrate, 5.30 g of aluminum sulfate and 6.1 g of titanyl sulfate were dissolved in 2000 g of water. A 0.1 N aqueous solution of NaOH and 0.1 N aqueous ammonia were added to the resultant solution up to the pH of 11.0 in a reaction vessel kept at 60° C., so as to obtain a coprecipitated product. This coprecipitated product was washed with pure water five times and dried at 120° C. for 6 hours. The above procedure provided a hydroxide (large-particle-size precursor) having a composition of $Co_{0.9955}Mg_{0.001}Al_{0.003}Ti_{0.0005}(OH)_2$, $D_{50}$ of 13 μm and a Co content of 59.3% by weight.

Next, 573.78 g of cobalt sulfate heptahydrate, 15.31 g of magnesium sulfate heptahydrate, 12.46 g of aluminum sulfate and 6.1 g of titanyl sulfate were dissolved in 2000 g of water. A 0.5 N aqueous solution of NaOH and 0.5 N aqueous ammonia were added to the resultant solution up to the pH of 11.0 in a reaction vessel kept at 60° C., so as to obtain a coprecipitated product. This coprecipitated product was washed with pure water five times and dried at 120° C. for 6 hours. The above procedure provided a hydroxide (small-particle-size precursor) having a composition of $Co_{0.9795}Mg_{0.010}Al_{0.010}Ti_{0.0005}(OH)_2$, $D_{50}$ of 3 μm and a Co content of 58.5% by weight.

151.84 g of the large-particle-size precursor, 50.80 g of the small-particle-size precursor and 76.08 g of lithium carbonate having an Li content of 18.7% by weight were mixed in a mortar and the mixture was fired at 990° C. in an oxygen-containing atmosphere for 14 hours. The above procedure provided lithium-containing composite oxide particles having a composition of $Li_{1.00}Co_{0.9915}Mg_{0.003}Al_{0.005}Ti_{0.005}O_2$.

A particle size distribution of the lithium-containing composite oxide powder thus obtained was measured in an aqueous medium by a laser scattering particle size distribution analyzer, and as a result, the lithium-containing composite oxide was substantially spherical particles having $D_{50}$ of 12.7 μm, $D_{10}$ of 8.4 μm, $D_{90}$ of 19.7 μm and a specific surface area of 0.43 m²/g.

With the lithium-containing composite oxide powder thus obtained, an X-ray diffraction spectrum was obtained with an X-ray diffraction apparatus (RINT 2100 model, manufactured by Rigaku Corporation). In the powder X-ray diffraction analysis using CuKα radiation, the half-value width of the diffraction peak of the (110) plane at 2θ=66.5±1° was 0.114°. The press density of this powder was 3.30 g/cm$^3$.

The above lithium-containing composite oxide powder, acetylene black and polyvinylidene fluoride powders were mixed at a weight ratio of 90/5/5, and N-methylpyrrolidone was added to form a slurry, which was applied onto one side of aluminum foil having a thickness of 20 μm, by a doctor blade. After drying, roll pressing was carried out five times to obtain a positive electrode sheet for a lithium battery.

Then two simplified sealed cell type lithium batteries of stainless steel were assembled in an argon grove box, using a punched sheet from the positive electrode sheet as a positive electrode, a metal lithium foil having a thickness of 500 μm as a negative electrode, a nickel foil of 20 μm as a negative electrode current collector, a porous polypropylene having a thickness of 25 μm as a separator and an LiPF$_6$/EC+DEC(1:1) solution (which means a mixed solution of EC and DEC in a weight ratio (1:1) whose solute is LiPF$_6$; the same also applies to solvents as mentioned hereinafter) in a concentration of 1M as an electrolyte.

One battery out of the above two was charged up to 4.3 V at a load current of 75 mA per 1 g of the cathode active material at 25° C., and discharged down to 2.5 V at a load current of 75 mA per 1 g of the cathode active material, thereby obtaining a weight capacity density in the first charge and discharge (which may be referred to as "an initial weight capacity density" in the present specification). Next, this battery was charged up to 4.3 V at a load current of 75 mA, and discharged down to 2.5 V at a load current of 113 mA, whereby a discharge capacity was obtained. Furthermore, with this battery, the charge and discharge cycle test was sequentially carried out 30 times, and a discharge capacity was obtained. As a result, the initial weight capacity density of the cathode active material at from 2.5 to 4.3 V at 25° C. was 156 mAh/g. The high-load capacity retention obtained from the discharge capacity in the discharge at the high load of 113 mA was 96.3%, which is associated with the charge and discharge rate property. Furthermore, the capacity retention after 30 charge and discharge cycles was 99.1%.

Moreover, the other battery was charged at 4.3 V for 10 hours, and then disassembled in the argon grove box. The positive electrode sheet after charged was taken out, washed, punched into a diameter of 3 mm, and then sealed with EC in an aluminum capsule. Then, while the temperature was raised at a rate of 5° C./min by a scanning differential calorimeter, a heat generation starting temperature was measured. As a result, the heat generation starting temperature of a heat generation curve of the 4.3 V-charged product was 156° C.

The above lithium-containing composite oxide powder was classified into small particles and large particles at the small particles:the large particles (ratio of % by weight)=30:70 by means of an Elbow-Jet classification machine (MATSUBO-EJ-L-3 model). The large particles thus obtained had a specific surface area of 0.30 m$^2$/g, $D_{10}$ of 11.0 μm, $D_{50}$ of 14.4 μm, $D_{90}$ of 20.1 μm and a composition of $Li_{1.00}Co_{0.955}Mg_{0.001}Al_{0.003}Ti_{0.0005}O_2$. On the other hand, the small particles thus obtained had a specific surface area of 0.90 m$^2$/g, $D_{10}$ of 3.2 μm, $D_{50}$ of 4.6 μm, $D_{90}$ of 7.4 μm and a composition of $Li_{1.00}Co_{0.9805}Mg_{0.009}Al_{0.010}Ti_{0.0005}O_2$. In this case, the ratio of an amount of the added elements in the large particles to an amount of the add elements in the small particles (yl/ys) was 0.23.

Example 2

Comparative Example 583.52 g of cobalt sulfate heptahydrate, 4.57 g of magnesium sulfate heptahydrate, 6.20 g of aluminum sulfate and 0.6 g of titanyl sulfate were dissolved in 2,000 g of water. A 0.1 N aqueous solution of NaOH and 0.1 N aqueous ammonia were added to the resultant solution up to the pH of 11.0 in a reaction vessel kept at 60° C., so as to obtain a coprecipitated product. This coprecipitated product was washed with pure water five times and dried at 120° C. for 6 hours. The above procedure provided a hydroxide (a large-particle-size precursor) having a composition of $Co_{0.9915}Mg_{0.003}Al_{0.005}Ti_{0.0005}(OH)_2$, $D_{50}$ of 13 μm and a Co content of 59.6% by weight.

Next, 583.52 g of cobalt sulfate heptahydrate, 4.57 g of magnesium sulfate heptahydrate, 6.20 g of aluminum sulfate and 0.6 g of titanyl sulfate were dissolved in 2,000 g of water. A 0.5 N aqueous solution of NaOH and 0.5 N aqueous ammonia were added to the resultant solution up to the pH of 11.0 in a reaction vessel kept at 60° C., so as to obtain a coprecipitated product. This coprecipitated product was washed with pure water five times and dried at 120° C. for 6 hours. The above procedure provided a hydroxide (a small-particle-size precursor) having a composition of $Co_{0.9915}Mg_{0.003}Al_{0.005}Ti_{0.0005}(OH)_2$, $D_{50}$ of 3 μm and a Co content of 59.1% by weight.

150.70 g of the resultant Large-particle-size precursor, 50.66 g of the resultant small-particle-size precursor and 76.08 g of lithium carbonate having an Li content of 18.7% by weight were mixed in a mortar and the mixture was fired at 990° C. in an oxygen-containing atmosphere for 14 hours. The above procedure provided lithium-containing composite oxide particles having a composition of $Li_{1.00}Co_{0.9915}Mg_{0.003}Al_{0.005}Ti_{0.0005}O_2$.

A particle size distribution of the lithium-containing composite oxide powder obtained by crushing the above fired product was measured in an aqueous medium by a laser scattering particle size distribution analyzer, and as a result, the lithium-containing composite oxide was substantially spherical particles having $D_{50}$ of 13.1 μm, $D_{10}$ of 8.0 μm, $D_{90}$ of 20.6 μm and a specific surface area of 0.41 m$^2$/g obtained by the BET method.

With the lithium-containing composite oxide powder thus obtained, an X-ray diffraction spectrum was obtained with an X-ray diffraction apparatus (RINT 2100 model, manufactured by Rigaku Corporation). In the powder X-ray diffraction analysis using CuKα radiation, the half-value width of the diffraction peak of the (110) plane at 2θ=66.5±1° was 0.115°. The press density of this powder was 3.31 g/cm$^3$.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 156 mAh/g; the high-load capacity retention was 91.1%; and the capacity retention after the 30 charge and discharge cycles was 99.0%.

Furthermore, while the temperature was raised at a rate of 5° C./min by a scanning differential calorimeter, a heat generation starting temperature was measured. As a result, the heat generation starting temperature of a heat generation curve of the 4.3 V-charged product was 151° C.

The above lithium-containing composite oxide powder was classified into small particles and large particles at the small particles:the large particles (ratio of % by weight)=30:

70 by means of an Elbow-Jet classification machine (MATSUBO-EJ-L-3 model). The large particles thus obtained had a specific surface area of 0.28 m$^2$/g, $D_{10}$ of 11.3 μm, $D_{50}$ of 14.0 μm, $D_{90}$ of 21.3 μm and a composition of $Li_{1.00}Co_{0.9915}Mg_{0.003}Al_{0.005}Ti_{0.0005}O_2$. On the other hand, the small particles thus obtained had a specific surface area of 0.91 m$^2$/g, $D_{10}$ of 2.8 μm, $D_{50}$ of 4.3 μm, $D_9$ of 6.9 μm and a composition of $Li_{1.00}Co_{0.9915}Mg_{0.003}Al_{0.005}Ti_{0.0005}O_2$. In this case, the ratio of an amount of the added elements in the large particles to an amount of the added elements in the small particles (yl/ys) was 1.00.

Example 3

199.60 g of a cobalt oxyhydroxide mixture comprising 70% by weight of cobalt oxyhydroxide with an average particle size of 17 μm and a cobalt content of 60.0% by weight and 30% by weight of cobalt oxyhydroxide with an average particle size of 3 μm and a cobalt content of 60.0% by weight was added and mixed in an aqueous solution obtained by mixing 0.36 g of magnesium hydroxide having an Mg content of 41.63% by weight, 6.15 g of an aqueous solution of aluminum lactate having an Al content of 4.50% by weight, 0.61 g of an aqueous solution of titanium lactate having a Ti content of 8.10% by weight and 0.86 g of citric acid monohydrate in 72.02 g of water.

The resultant mixture was dried in a constant-temperature oven kept at 80° C., and the dried mixture was mixed with 76.07 g of lithium carbonate having a lithium content of 18.70% by weight in a mortar, followed by firing at 990° C. in an oxygen-containing atmosphere for 14 hours. A fired product having a composition of $Li_{1.00}Co_{0.9915}Mg_{0.003}Al_{0.005}Ti_{0.0005}O_2$ was obtained by the above procedure.

The above fired product was crushed and a particle size distribution of the lithium-containing composite oxide powder thus obtained was measured in an aqueous medium by a laser scattering particle size distribution analyzer. As a result, the powder was substantially spherical particles having $D_{50}$ of 14.1 μm, $D_{10}$ of 5.7 μm, $D_{90}$ of 25.3 μm and a specific surface area of 0.45 m$^2$/g obtained by the BET method.

With the lithium-containing composite oxide powder thus obtained, an X-ray diffraction spectrum was obtained with an X-ray diffraction apparatus (RINT 2100 model, manufactured by Rigaku Corporation). In the powder X-ray diffraction analysis using CuKα radiation, the half-value width of the diffraction peak of the (110) plane at 2θ=66.5±1° was 0.110°. The press density of this powder was 3.35 g/cm$^3$.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 156 mAh/g; the high-load capacity retention was 96.9%; and the capacity retention after the 30 charge and discharge cycles was 99.3%.

Furthermore, while the temperature was raised at a rate of 5° C./min by a scanning differential calorimeter, a heat generation starting temperature was measured. As a result, the heat generation starting temperature of a heat generation curve of the 4.3 V-charged product was 158° C.

The above lithium-containing composite oxide powder was classified into small particles and large particles at the small particles:the large particles (ratio of % by weight)=30:70 by means of an Elbow-Jet classification machine (MATSUBO-EJ-L-3 model). The large particles thus obtained had a specific surface area of 0.17 m$^2$/g, $D_{10}$ of 15.1 μm, $D_{50}$ of 18.8 μm, $D_{90}$ of 24.9 μm and a composition of $Li_{1.00}Co_{0.9966}Mg_{0.001}Al_{0.002}Ti_{0.0004}O_2$. On the other hand, the small particles thus obtained had a specific surface area of 0.93 m$^2$/g, $D_{10}$ of 1.7 μm, $D_{50}$ of 3.1 μm, $D_{90}$ of 6.0 μm and a composition of $Li_{1.00}Co_{0.9724}Mg_{0.010}Al_{0.017}Ti_{0.0006}O_2$. In this case, the ratio of an amount of the added elements in the large particles to an amount of the added elements in the small particles (yl/ys) was 0.11.

Example 4

197.32 g of a cobalt oxyhydroxide mixture comprising 70% by weight of cobalt oxyhydroxide with an average particle size of 17 μm and a cobalt content of 60.0% by weight and 30% by weight of cobalt oxyhydroxide with an average particle size of 3 μm and a cobalt content of 60% by weight was added and mixed in an aqueous solution obtained by mixing 1.20 g of magnesium hydroxide having a Mg content of 41.63% by weight, 12.30 g of an aqueous solution of aluminum lactate having an Al content of 4.50% by weight, 1.31 g of zirconium ammonium carbonate having a Zr content of 14.58% by weight and 3.45 g of citric acid monohydrate in 61.74 g of water. The resultant mixture was dried in a constant-temperature oven kept at 80° C., and the dried mixture was mixed with 77.69 g of lithium carbonate having a lithium content of 18.70% by weight in a mortar, followed by firing at 990° C. in an oxygen-containing atmosphere for 14 hours, thereby obtaining a fired product having a composition of $Li_{1.01}(Co_{0.979}Mg_{0.01}Al_{0.01}Zr_{0.001})_{0.99}O_2$.

The above fired products was crushed and a particle size distribution of the lithium-containing composite oxide powder thus obtained was measured in an aqueous medium by a laser scattering particle size distribution analyzer. As a result, the powder was substantially spherical particles having an average particle size $D_{50}$ of 14.9 μm, $D_{10}$ of 4.8 μm, $D_{90}$ of 25.2 μm and a specific surface area of 0.25 m$^2$/g obtained by the BET method.

With the lithium-containing composite oxide powder thus obtained, an X-ray diffraction spectrum was obtained with an X-ray diffraction apparatus (RINT 2100 model, manufactured by Rigaku Corporation). In the powder X-ray diffraction analysis using CuKα radiation, the half-value width of the diffraction peak of the (110) plane at 2θ=66.5±1° was 0.106°. The press density of this powder was 3.25 g/cm$^3$.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 152 mAh/g; the high-load capacity retention was 96.2%; and the capacity retention after the 30 charge and discharge cycles was 99.5%.

Furthermore, while the temperature was raised at a rate of 5° C./min by a scanning differential calorimeter, a heat generation starting temperature was measured. As a result, the heat generation starting temperature of a heat generation curve of the 4.3 V-charged product was 162° C.

The above lithium-containing composite oxide powder was classified into small particles and large particles at the small particles:the large particles (ratio of % by weight)=30:70 by means of an Elbow-Jet classification machine (MATSUBO-EJ-L-3 model). The large particles thus obtained had a specific surface area of 0.10 m$^2$/g, $D_{10}$ of 12.8 μm, $D_{50}$ of 17.1 μm, $D_{90}$ of 26.0 μm and a composition of $Li_{1.01}(Co_{0.9895}Mg_{0.005}Al_{0.005}Zr_{0.0005})_{0.99}O_2$. On the other hand, the small particles thus obtained had a specific surface area of 0.60 m$^2$/g, D$_{10}$ of 1.9 μm, D$_{50}$ of 3.0 μm, D$_{90}$ of 6.1 μm and a composition of Li$_{1.01}$(Co$_{0.9549}$Mg$_{0.021}$Al$_{0.022}$Zr$_{0.0021}$)$_{0.99}$O$_2$. In this case, the ratio of an amount of the added elements in the large particles to an amount of the added elements in the small particles (yl/ys) was 0.23.

Example 5

Comparative Example 138.12 g of cobalt oxyhydroxide having a cobalt content of 60.0% by weight and an average particle size of 13 μm was added and mixed in an aqueous solution obtained by mixing 0.84 g of magnesium hydroxide having a Mg content of 41.63% by weight, 8.62 g of an aqueous solution of aluminum lactate having an Al content of 4.50% by weight, 0.92 g of an aqueous solution of zirconium ammonium carbonate having a Zr content of 14.58% by weight and 2.42 g of citric acid monohydrate in 36.20 g of water. The resultant mixture was dried in a constant-temperature oven kept at 80° C. to obtain a large-particle-size precursor.

Next, the above cobalt oxyhydroxide was pulverized by a jet mill so that an average particle size became about 3 μm. 59.2 g of the pulverized cobalt oxyhydroxide was mixed with an aqueous solution obtained by mixing 0.36 g of magnesium hydroxide having a Mg content of 41.63% by weight, 3.69 g of an aqueous solution of aluminum lactate having an Al content of 4.50% by weight, 0.39 g of an aqueous solution of zirconium ammonium carbonate having a Zr content of 14.58% by weight and 1.04 g of citric acid monohydrate in 15.52 g of water. The resultant mixture was dried in a constant-temperature oven kept at 80° C. to obtain a small-particle-size precursor.

The above large-particle-size precursor and small-particle-size precursor were mixed, and the mixture was then mixed with 77.69 g of lithium carbonate having a lithium content of 18.70% by weight in a mortar. Next, the resultant mixture was fired at 990° C. in an oxygen-containing atmosphere for 14 hours to obtain a fired product having a composition of Li$_{1.01}$(Co$_{0.979}$Mg$_{0.01}$Al$_{0.01}$Zr$_{0.001}$)$_{0.99}$O$_2$.

The above fired product was crushed and a particle size distribution of the lithium-containing composite oxide powder thus obtained was measured in an aqueous medium by a laser scattering particle size distribution analyzer. As a result, the powder was substantially spherical particles having D$_{50}$ of 15.1 μm, D$_{10}$ of 6.2 μm, D$_{90}$ of 21.5 μm and a specific surface area of 0.25 m$^2$/g obtained by the BET method.

With the lithium-containing composite oxide powder thus obtained, an X-ray diffraction spectrum was obtained with an X-ray diffraction apparatus (RINT 2100 model, manufactured by Rigaku Corporation). In the powder X-ray diffraction analysis using CuKα radiation, the half-value width of the diffraction peak of the (110) plane at 2θ=66.5±1° was 0.105°. The press density of this powder was 3.27 g/cm$^3$.

Electrodes and batteries were prepared and evaluated in the same manner as in Example 1 except that the positive electrode sheet was ore prepared using the above lithium-containing composite oxide.

As a result, the initial weight capacity density of the cathode active material at from 2.5 to 4.3 V at 25° C. was 152 mAh/g; the high-load capacity retention was 89.3%; and the capacity retention after the 30 charge and discharge cycles was 99.0%.

Furthermore, while the temperature was raised at a rate of 5° C./min by a scanning differential calorimeter, a heat generation starting temperature was measured. As a result, the heat generation starting temperature of a heat generation curve of the 4.3 V-charged product was 158° C.

The above lithium-containing composite oxide powder was classified into small particles and large particles at the small particles:the large particles (ratio of % by weight)=30: 70 by means of an Elbow-Jet classification machine (MATSUBO-EJ-L-3 model). The large particles thus obtained had a specific surface area of 0.11 m$^2$/g, D$_{10}$ of 11.9 μm, D$_{50}$ of 17.6 μm, D$_{90}$ of 22.0 μm and a composition of Li$_{1.01}$(Co$_{0.979}$Mg$_{0.01}$Al$_{0.01}$Zr$_{0.001}$)$_{0.99}$O$_2$. On the other hand, the small particles thus obtained had a specific surface area of 0.58 m$^2$/g, D$_{10}$ of 2.4 μm, D$_{50}$ of 3.6 μm, D$_{90}$ of 6.3 μm and a composition of Li$_{1.01}$(Co$_{0.979}$Mg$_{0.01}$Al$_{0.01}$Zr$_{0.001}$)$_{0.99}$O$_2$. In this case, the ratio of an amount of the added elements in the large particles to an amount of the added elements in the small particles (yl/ys) was 1.00.

INDUSTRIAL APPLICABILITY

The present invention provides a positive electrode for a lithium secondary battery, which has a large volume capacity density, high safety and an excellent cycle property and which further has an excellent charge and discharge rate property, and a lithium secondary battery using the positive electrode. Furthermore, a lithium-containing composite oxide used as a material for the above positive electrode for the lithium secondary battery is produced by the production process of the present invention. They are useful in the field of lithium secondary battery and their applicability is extremely high in this field.

The entire disclosure of Japanese Patent Application No. 2006-356107 filed on Dec. 28, 2006 including the specification, claims, and summary is incorporated herein by reference in its entirety.

What is claimed is:

1. A lithium-containing composite oxide represented by the general formula Li$_p$N$_x$M$_y$O$_z$F$_a$ (where N is at least one element selected from the group consisting of Co, Mn and Ni, M is at least one element selected from the group consisting of Al, Sn, alkaline earth metal elements and transition metal elements other than Co, Mn and Ni, 0.9≦p≦1.2, 0.965≦x<2.00, 0<y≦0.035, 1.9≦z≦4.2, and 0≦a≦0.05, wherein when a powder of the lithium-containing composite oxide is classified into small particles with an average particle size Ds$_{50}$ of 2 μm≦Ds$_{50}$≦8 μm and large particles with an average particle size Dl$_{50}$ of 10 μm≦Dl$_{50}$≦25 μm, the content of the small particles is from 15 to 40% by weight, and the content of the large particles is from 60 to 85% by weight, and 0.01≦ys≦0.06, 0.001≦y≦0.02 and 0.01≦yl/ys≦0.7, where ys is a proportion of the M element in the general formula in the small particles, and yl is a proportion of the M element in the general formula in the large particles.

2. The lithium-containing composite oxide according to claim 1, wherein a specific surface area of the small particles is from 0.5 to 1.5 m$^2$/g, a specific surface area of the large particles is from 0.1 to 0.5 m$^2$/g, and a specific surface area of the sum of the small particles and large particles is from 0.2 to 0.5 m$^2$/g.

3. The lithium-containing composite oxide according to claim 1, wherein the M element comprises Al and at least one element selected from the group consisting of Mg, Zr, Ti, Hf, Nb, Ta, Sn and Zn.

4. The lithium-containing composite oxide according to claim 1, wherein the M element comprises at least Al or Mg, and wherein a total amount of Al and Mg in the small particles is larger than that in the large particles.

5. The lithium-containing composite oxide according to claim 1, wherein the M element comprises at least Al and Mg.

6. The lithium-containing composite oxide according to claim 1, wherein the M element comprises Al and at least one of Zr and Ti, and an atomic ratio of Al/(total of Zr and Ti) is from 1/20 to 40/1.

7. A process for producing the lithium-containing composite oxide as defined in claim 1, which comprises mixing a mixture containing from 15 to 40% by weight of a small-particle-size precursor with an average particle size of 2 $\mu m \leqq D_{50} \leqq 8$ μm in which from 1 to 6 atomic % of the M element based on a total of the M and N elements, is supported on an N element source, and from 60 to 85% by weight of a large-particle-size precursor with an average particle size of 10 $\mu m \leqq D_{50} \leqq 25$ μm in which at most 2 atomic % of the M element based on a total of the M and N elements, is supported on the N element source, a lithium source, and, if necessary, a fluorine source; and firing the resultant mixture at a temperature of from 700° C. to 1,100° C. in an oxygen-containing atmosphere.

8. The process for producing the lithium-containing composite oxide according to claim 7, wherein the mixture of the small-particle-size precursor and the large-particle-size precursor in which the M element is supported on the N element source, is an N element-M element coprecipitated product.

9. A process for producing the lithium-containing composite oxide as defined in claim 1, which comprises mixing a lithium source and, if necessary, a fluorine source in a precursor in which the M element is supported on an N element source, obtained by mixing the N element source containing from 15 to 40% by weight of a small-particle-size N element source with an average particle size of 2 $\mu m \leqq D_{50} \leqq 8$ μm and from 60 to 85% by weight of a large-particle-size N element source with an average particle size of 10 $\mu m \leqq D_{50} \leqq 25$ μm and an M element source comprising an aqueous solution of an M element-containing carboxylate; and firing the resultant mixture at from 700° C. to 1,100° C. in an oxygen-containing atmosphere.

10. The process for producing the lithium-containing composite oxide according to claim 9, wherein the M element-containing carboxylate is a salt of at least one acid selected from the group consisting of citric acid, maleic acid, lactic acid and tartaric acid.

11. The process for producing the lithium-containing composite oxide according to claim 9, wherein the aqueous solution of the M element-containing carboxylate has a pH of from 2 to 12.

12. The process for producing the lithium-containing composite oxide according to claim 7, wherein the N element source is at least one member selected from the group consisting of a nickel salt, a cobalt salt, a nickel-cobalt coprecipitated product and a nickel-cobalt-manganese coprecipitated product.

13. The process for producing the lithium-containing composite oxide according to claim 7, wherein the N element source is at least one member selected from the group consisting of cobalt hydroxide, cobalt oxyhydroxide, tricobalt tetroxide and cobalt carbonate.

14. The lithium-containing composite oxide produced by the process as defined in claim 7.

15. A positive electrode for a lithium secondary battery comprising a cathode active material, a binder and an electroconductive material, wherein the cathode active material comprises the lithium-containing composite oxide as defined in claim 1.

16. A lithium secondary battery comprising a positive electrode, a negative electrode, a non-aqueous electrolyte and an electrolytic solution, wherein the positive electrode is as defined in claim 15.

* * * * *